US010609936B2

(12) United States Patent
Penner (10) Patent No.: US 10,609,936 B2
(45) Date of Patent: Apr. 7, 2020

(54) TREATING SOLUBLE COFFEE (71) Applicant: Intercontinental Great Brands LLC, East Hannover, NJ (US)

(72) Inventor: Amy L. Penner, Banbury (GB)

(73) Assignee: Intercontinental Great Brands LLC, East Hannover, NJ (US)

(*) Notice: Subject to any disclaimer, the term of this patent is extended or adjusted under 35 U.S.C. 154(b) by 0 days.

(21) Appl. No.: 14/646,658

(22) PCT Filed: Nov. 15, 2013

(86) PCT No.: PCT/IB2013/002817
§ 371 (c)(1),
(2) Date: May 21, 2015

(87) PCT Pub. No.: WO2014/083422
PCT Pub. Date: Jun. 5, 2014

(65) Prior Publication Data
US 2015/0296829 A1    Oct. 22, 2015

(30) Foreign Application Priority Data
Nov. 28, 2012 (GB) .................................. 1221415.1

(51) Int. Cl.
*A23F 5/40*    (2006.01)
*A23F 5/46*    (2006.01)
*A23F 3/00*    (2006.01)

(52) U.S. Cl.
CPC ............... *A23F 5/405* (2013.01); *A23F 5/46* (2013.01); *A23F 3/00* (2013.01)

(58) Field of Classification Search
None
See application file for complete search history.

(56) References Cited

U.S. PATENT DOCUMENTS

| 2,998,316 A | 8/1961 | Reich |
| 3,493,388 A | 2/1970 | Hair |
| 4,606,921 A | 8/1986 | Liu |
| 5,079,026 A * | 1/1992 | Arora ........................ A23F 5/36 426/388 |

(Continued)

FOREIGN PATENT DOCUMENTS

| CA | 837021 A | 3/1970 | |
| CA | 2705101 A1 * | 5/2009 | ............... A23F 5/38 |

(Continued)

OTHER PUBLICATIONS

Notice of Reasons for Rejection, dated Mar. 4, 2016 for Japanese Patent Application No. 2015-541253, English translation (13 pgs.).

(Continued)

*Primary Examiner* — Tamra L. Dicus
(74) *Attorney, Agent, or Firm* — Fitch, Even, Tabin & Flannery LLP (57) ABSTRACT

The present invention provides a method for treating soluble coffee, the method comprising: providing a soluble coffee powder; providing a coffee oil in an amount of from 0.5 to 4 wt % relative to the soluble coffee powder; providing water in an amount of from 1 to 3 wt % relative to the soluble coffee powder; and mixing the soluble coffee powder with the coffee oil and then with the water.

13 Claims, 3 Drawing Sheets

(56) References Cited

U.S. PATENT DOCUMENTS

| | | | |
|---|---|---|---|
| 5,236,729 A | | 8/1993 | Schlecht et al. |
| 5,741,538 A | * | 4/1998 | Stipp .................. A23F 5/38 |
| | | | 426/594 |
| 5,750,178 A | * | 5/1998 | Cheng .................. A23F 5/48 |
| | | | 426/388 |
| 8,043,645 B2 | | 10/2011 | Robinson et al. |
| 2002/0119235 A1 | * | 8/2002 | Zeller .................. A23F 5/40 |
| | | | 426/594 |
| 2005/0112265 A1 | | 5/2005 | Ceriali et al. |
| 2007/0248731 A1 | * | 10/2007 | Curti .................. A23F 5/02 |
| | | | 426/533 |
| 2010/0215818 A1 | * | 8/2010 | Kessler .................. A23F 5/34 |
| | | | 426/329 |

FOREIGN PATENT DOCUMENTS

| | | |
|---|---|---|
| CN | 1035225 C | 6/1997 |
| CN | 1085052 C | 5/2002 |
| CN | 1104850 C | 4/2003 |
| CN | 102088863 A | 6/2011 |
| EP | 0047169 A3 | 3/1982 |
| EP | 0560609 A1 | 9/1993 |
| GB | 1399650 | 7/1975 |
| JP | H10512760 A | 12/1998 |
| JP | 2000-506001 A | 5/2000 |
| JP | 2001-508658 A | 7/2001 |
| JP | 2006-020639 A | 1/2006 |
| KR | 10-1986-0006933 A | 10/1986 |
| KR | 10-2000-0070393 A | 11/2000 |
| MX | 2007001484 A | 9/2012 |
| WO | 9623423 A1 | 8/1996 |
| WO | 9729651 A1 | 8/1997 |
| WO | 98/32339 | 7/1998 |
| WO | 2006020613 A1 | 2/2006 |
| WO | 201000604 A1 | 1/2010 |
| WO | 2011107827 A1 | 9/2011 |

OTHER PUBLICATIONS

International Search Report, dated Jun. 27, 2014 for International Application No. PCT/IB2013/002817 (3 pgs.).
Intellectual Property Office Search Report, dated Mar. 1, 2013 for Application No. GB1221415.1 (3 pgs.).
Examination Report, dated Apr. 5, 2016 for Russian Patent Application No. 2015113322, English Translation herewith (7 pgs).
Examination Report, dated Jul. 27, 2016 for Russian Patent Application No. 2015113322, English Translation herewith (8 pgs).
Notification of Reason for Refusal, dated Sep. 9, 2016 for Korean Patent Application No. 10-2015-7013389, English translation (10 pgs.).
Notification of Reason for Refusal, dated Jul. 28, 2017 for Korean Patent Application No. 10-2015-7013389, English translation (4 pgs.).
Notice of Reasons for Rejection, dated Sep. 27, 2016 for Japanese Patent Application No. 2015-541253, English Translation (3 pgs.).
Notice of Reasons for Rejection, dated Mar. 29, 2017 for Japanese Patent Application No. 2015-541253, English Translation (2 pgs.).
Notification of the First Office Action, dated Jun. 24, 2016 for Chinese Patent Application No. 201380059608.5, English Translation (4 pgs.).
Notification of the Second Office Action, dated Mar. 21, 2017 for Chinese Patent Application No. 201380059608.5, English Translation herewith (12 pgs.).
Examination Report, dated Dec. 23, 2016 for Russian Patent Application No. 2015113322, English Translation herewith (9 pgs.).

* cited by examiner

TREATING SOLUBLE COFFEE

CROSS REFERENCE TO RELATED APPLICATIONS

This application is a U.S. national phase application of International Application No. PCT/IB2013/002817, filed Nov. 15, 2013, which claims benefit from Great Britain Application 1221415.1, filed Nov. 28, 2012, which are hereby incorporated herein by reference in their entirety.

FIELD

This disclosure relates to a method of treating soluble coffee powders. In particular, the disclosure relates to a treatment process whereby the appearance, flowability and aroma properties of the soluble coffee powder are improved.

BACKGROUND

It is well known to provide instant coffee powders to consumers. Consumers of soluble coffee enjoy a great tasting product with the benefit of convenient preparation, compared to a drip filter machine. Many consumers of roast and ground coffee are not willing to sacrifice the perceived taste benefits of the drip filter machine and switch to soluble coffee.

In recent years there have been significant strides in improving the quality of spray dried and freeze dried soluble coffee products. For example, the use of finely milled roast and ground coffee as an additive has allowed consumers to enjoy the experience of roast and ground coffee as part of a soluble coffee. The mouthfeel of such products differ from conventional soluble coffees due to the presence of the finely milled roast and ground particles. These particles are insoluble and they introduce their inherent oil into the soluble coffee, which typically does not contain oil. It is known from espresso drinks that the fine oil particulates, as achieved by high pressure espresso extraction, contribute positively to mouthfeel.

It is also known to introduce coffee oils into the packaging (on the lid, for example) for freeze dried coffees. These oils are obtained by advanced aroma recovery techniques to derive coffee aroma ("Coloma") which is then added back at very small percentages (standard at 0.03%, +1-0.02%, by weight) to the final jar. Spray dried coffee cannot use Coloma oil in this way since it would form a blob at the surface of the jar; for freeze dried coffee it is adsorbed into the coffee. This level of oil addition gives the initial perception of coffee aroma when the jar is opened, but is quickly lost upon multiple openings of the jar and it is diffused from the jar.

Despite these improvements in soluble coffee aroma, flavour and mouthfeel, some roast and ground consumers still reject these products due to their 'dead' appearance (small, dry, light coloured, dusty granules) whereas roast and ground coffee (R&G) is considered to have a more 'alive' appearance. The surface texture, colour, and appearance are hurdles that prevent some consumers from even trying soluble coffee. In order to provide a commercial soluble coffee product to these customers it is necessary to overcome these problems.

SUMMARY

Accordingly, it is desirable to provide an improved foaming beverage powder and/or tackle at least some of the problems associated with the prior art or, at least, to provide a commercially useful alternative thereto. It is an object of the disclosure to create a product with the convenience of soluble coffee but with a desirable appearance, colour, and/or aroma which can help overcome current consumer negative perceptions of soluble coffee.

In a first aspect the present disclosure provides a method for treating soluble coffee, the method comprising:
 providing a soluble coffee powder;
 providing a coffee oil in an amount of from 0.5 to 4 wt. % relative to the soluble coffee powder;
 providing water in an amount of from 1 to 3 wt. % relative to the soluble coffee powder; and
 mixing the soluble coffee powder with the coffee oil and then with the water.

The present disclosure will now be further described. In the following passages different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Soluble coffees are well known in the art and include spray-dried and freeze-dried coffees. Preferably the soluble coffee powder is spray-dried coffee powder. Spray dried coffees have typically had the hardest time being accepted by consumers due to their fine powdery appearance. Accordingly, the method described herein has a particularly pronounced benefit when used in combination with spray-dried coffee. Furthermore, when used on freeze-dried coffee samples, these techniques have generally been found to struggle to provide an even coating. It is therefore difficult to obtain an even coating with the low level of coffee oil added.

Preferably the soluble coffee powder is a foaming soluble coffee powder and/or comprises finely ground roasted coffee particles. Foaming soluble coffees are those containing trapped gas within pores of the coffee. Techniques for making such coffees include the addition of gas before drying and the addition of gas under pressure to the warmed coffee powder (above its Tg). Coffees that comprise finely ground roasted coffee particles are also well known and include, for example, Millicano™ coffee. The benefits of using foaming and/or R&G containing coffee in combination with the appearance and aroma boost provided with the method disclosed herein lead to a closer to authentic espresso coffee experience.

Coffee oil is derived from the oils contained within coffee beans. It is preferably extracted from roasted coffee beans and may be obtained by compressing the beans. The coffee oil preferably comprises Coloma oil and/or spent ground oil. Coloma oil is an aromatised coffee oil, composed of coffee oils extracted from coffee beans, together with additional coffee aroma compounds added to it. The production and collection of coffee aroma compounds is well known in the art. Production of Coloma oil is limited due to the cost and difficulties of obtaining a significant amount of concentrated aroma.

Spent ground oil is made from extracting any remaining oil from extracted coffee beans. This product is currently low-value oil and may be used for reducing dusting and gaining yield points. This low value product may also be used to create the surface texture needed at a lower cost while still providing an improved desirable aroma.

Preferably the coffee oil is in an amount of from 0.5 to 4 wt. % relative to the soluble coffee powder, preferably in an amount of about 0.6 wt. % to 2 wt. %, and most preferably from 0.8 to 1 wt. %. If the amount of coffee oil is too high, then slicks of oil may be seen on the surface of the soluble coffee. If the amount is too low, then the aroma benefits are not displayed for the final product.

The inventors have found that coffee oil on its own does not give the same level desirable aroma when simply applied to soluble coffee compared to the method disclosed herein. Instead, the inventors have discovered that the subsequent addition of water serves to unlock the aromatic profile of the coffee oils and boost the aroma of the product.

Water is mixed into the soluble coffee in an amount of from 1 to 3 wt. % relative to the soluble coffee powder. Preferably the water is added in an amount sufficient to provide a final moisture content of the soluble coffee of from 2.5 to 6 wt. % preferably from 3 to 6 wt. % preferably about 5 wt. %. This amount of moisture permits a long shelf life for the product while maximizing the aroma impact of the coffee product. Spray dried coffee generally has a moisture content of from 1.5 to 3 wt. % after spray drying.

The water is preferably added to the coffee as a fine spray during mixing. The water may be in the form of pure (tap or distilled) water or may be in the form of a coffee extract. When the water is in the form of a coffee extract, preferably the coffee solids form up to 50 wt. % of the aqueous extract, more preferably from 30 to 45 wt. %. If the solids are too high then the pumpability of the extract is reduced.

It is known in some prior art methods to introduce an amount of water into an amount of soluble coffee as a precursor to agglomeration techniques. These techniques typically occur at elevated temperature and result in an increase in the coffee power size. The technique disclosed herein, however, is not intended to agglomerate the coffee particles. In particular, the method is carried out with substantially no agglomeration of the soluble coffee powder. Preferably the D90 of the soluble coffee powder does not substantially increase, that is, the D90 of the particles after the treatment is within 10%, more preferably within 5% of the value before treatment. Methods of measuring D90 values are well known in the art. Preferably the method is carried out at a temperature of from 10 to 40° C., and preferably at about room temperature.

The step of mixing is sequential. That is, the soluble coffee powder must first be coated with the coffee oil and then with the water. If the coffee oil is not pre-coated onto the coffee then it has been found that the water tends to form isolated clumps in the coffee (due to partially dissolving the coffee). Without wishing to be bound by theory, it is speculated that the coffee oil serves to protect the coffee surface from the addition of the water. In addition, it has been found that the addition of a blend of water and coffee oil, i.e. simultaneous mixing with these components, does not provide the improved aroma in the final soluble coffee product.

The present inventors have discovered that it is possible to overcome the problems associated with the "dead" appearance by using the method described herein. This serves to texturise the surface. The changes to the surface texture offer three significant key advantages:

1) The powder properties behave more closely to roast and ground coffee than soluble coffee, thus removing any soluble 'cues' from the way that the powder flows or is scooped from the container, as well as eliminating dust.

2) The colour of the soluble coffee becomes significantly darker after texturization. This means that the coffee more closely matches the rich colours of freshly roasted coffee beans.

3) The jar aroma of the coffee is much stronger than that of normal soluble coffee and this provides a roast and ground impression when smelling the package.

Currently, soluble coffee is commonly sold in clear glass jars. The consumer can instantly notice the fine dusty powder granules generated from spray dry production or small, dry, porous granules made from freeze dry production. Both of these products also have an extremely high flowability, which is essential for moving within the factory using the standard transport systems. However, this flowability emphasises the difference between these products and roast and ground coffee. The present disclosure provides a method that creates a product with reduced flowability that is closer to roast and ground coffee, or is even less flowable than roast and ground coffee, so that the consumer can see the appreciable difference. Roast and ground coffee is removed from the container using a scoop and the product of the method disclosed herein has similar flow properties, such that it encourages scooping behaviour.

The process also serves to create a product with a darker colour than the starting soluble coffee. This appearance of roast and ground coffee is significantly dark than current soluble coffee and has a sheen from the oil present. The process for making the surface textured product described herein achieves a darker colour and alive appearance for all of the soluble coffees tested. The alive appearance is also achieved through the elimination of dust. Conventional or untreated spray dry powder produces dust when poured or spooned. The coffee treated with the method disclosed herein has reduced or eliminated dust from the surface coating, similar to roast and ground coffee which also does not contain dust.

The process disclosed herein also serves to create a product with an aroma more similar to that of roast and ground coffee than conventional soluble coffee. The aroma experienced by the consumer when opening the jar is a key indication of coffee freshness. A 'dead' product, such as soluble coffee, does not have the same aroma that is perceived from opening a new package of roast and ground coffee.

Preferably the method further comprises a step of grinding or milling the treated soluble coffee. The milling step can be conducted to ensure that the final coffee product has the desired particle size. Preferably there is no final milling step since this might disturb the improved surface texture.

The method is of particular use when applied to less porous coffee particles. It is speculated that this is because the treatment has a greater effect on the surface of each granule, rather than being absorbed into the pores of the coffee. Preferably the soluble coffee powder has a particle size such that the mean longest diameter (measured by Sympatec Laser diffraction system) is less than 300 microns, preferably less than 250 microns and preferably from 50 to 200 microns.

Preferably the method further comprising packaging the soluble coffee powder. Suitable packaging for the product includes tins, glasses, pods, cartridges, sachets and the like. Since the process improves the appearance and flow properties of the product, it is especially preferred that the product is provided in a jar and is visible to the consumer.

According to a second aspect, there is provided a soluble coffee powder obtainable by the method disclosed herein. The coffee powder produced according to the method disclosed herein is discernibly different from soluble coffees that have not been so-treated. The surface of the coffee is darker, there are fewer fines, the aroma impact is increased (see FIG. 1) and the flowability of the powder is reduced. The coffee powder has a flowability of wet sand.

According to a third aspect there is provided a method of preparing a beverage, the method comprising contacting the treated soluble coffee powder with an aqueous medium. The aqueous medium is preferably water or milk and is preferably hot (80 to 95° C.).

BRIEF DESCRIPTION OF THE DRAWINGS

The disclosure will now be described in relation to the following non-limiting figures, in which.

DETAILED DESCRIPTION

Figure 1:
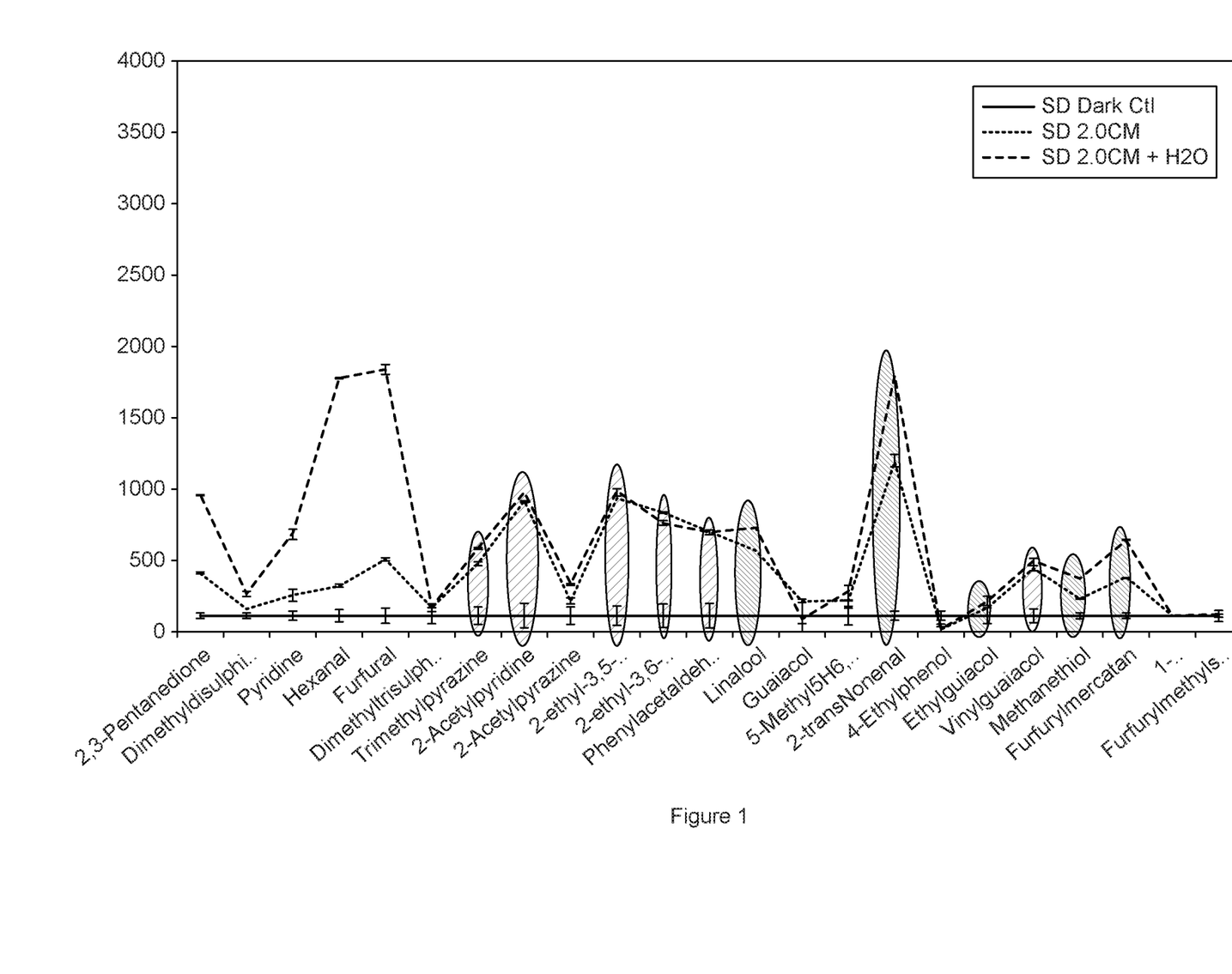
FIG. 1 shows a graph showing the comparative amounts of various aroma compounds released from the coffee on opening a coffee jar. The horizontal line is the control sample of an untreated coffee. The primarily uppermost line represents the compounds following the claimed treatment process. The further line is the profile after a treatment with just Coloma (CM) oil.

As shown in FIG. 1, when adding Coloma oil to the coffee the jar aroma is improved. When you add water in addition of Coloma oil, there appears to be a shift in the partition coefficient and, therefore, a difference in the aroma chemicals in the jar headspace.

It can be seen from the graph that the overall concentrations of aroma volatiles are increased when water was added to the coffee. The aroma compounds in the graphs labelled with darker shaded ovals resulting from shading lines being closer together show data where the Coloma oil with added water have statistically higher concentrations than those without water added to the Coloma oil. This shows that the levels of these compounds detected in the jar aroma increase due to the addition of the water.

The aroma compounds in the graphs labelled with lighter shaded ovals resulting from shading lines being further apart show data where the samples containing Coloma oil with added water and also samples with just Coloma oil added have statistically higher concentrations than the control samples with no added Coloma oil. Showing that the levels of these compounds detected in the jar aroma increase due to the Coloma oil, but are not significantly higher when water is added.

The aroma compounds in the graphs that are not labelled with an oval show data where there is not statistical difference between the control sample or the 2 test samples with increased Coloma oil.

Figure 2:
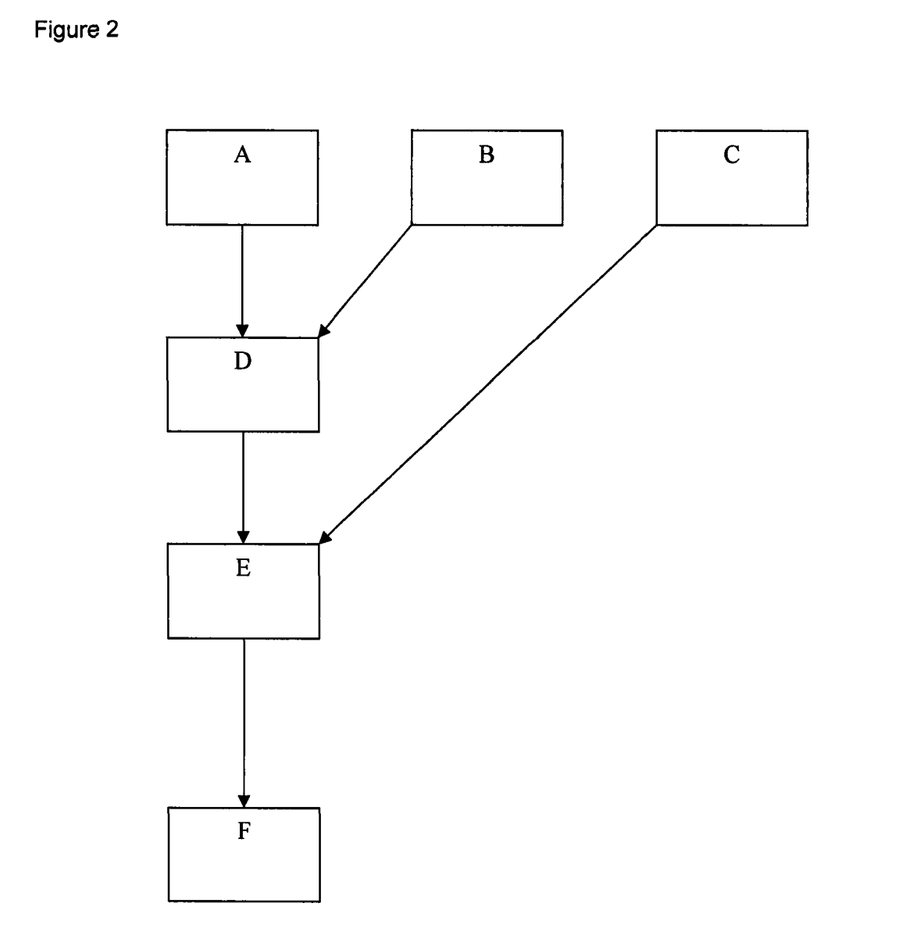
FIG. 2 shows a flow chart of the method described herein.
Figure 3A:
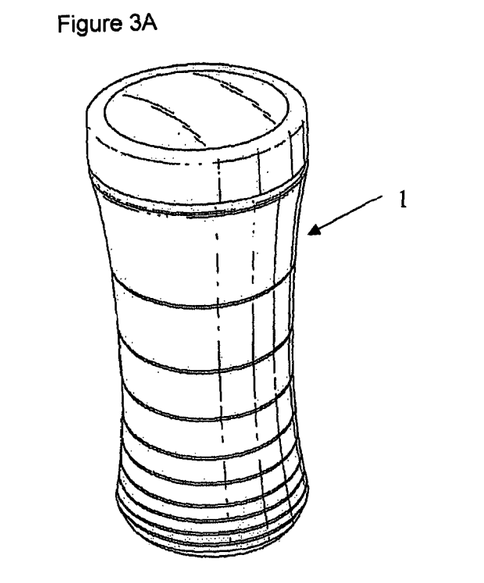
FIG. 3A shows a container 1, suitable for holding an instant coffee composition as disclosed herein.
Figure 3B:
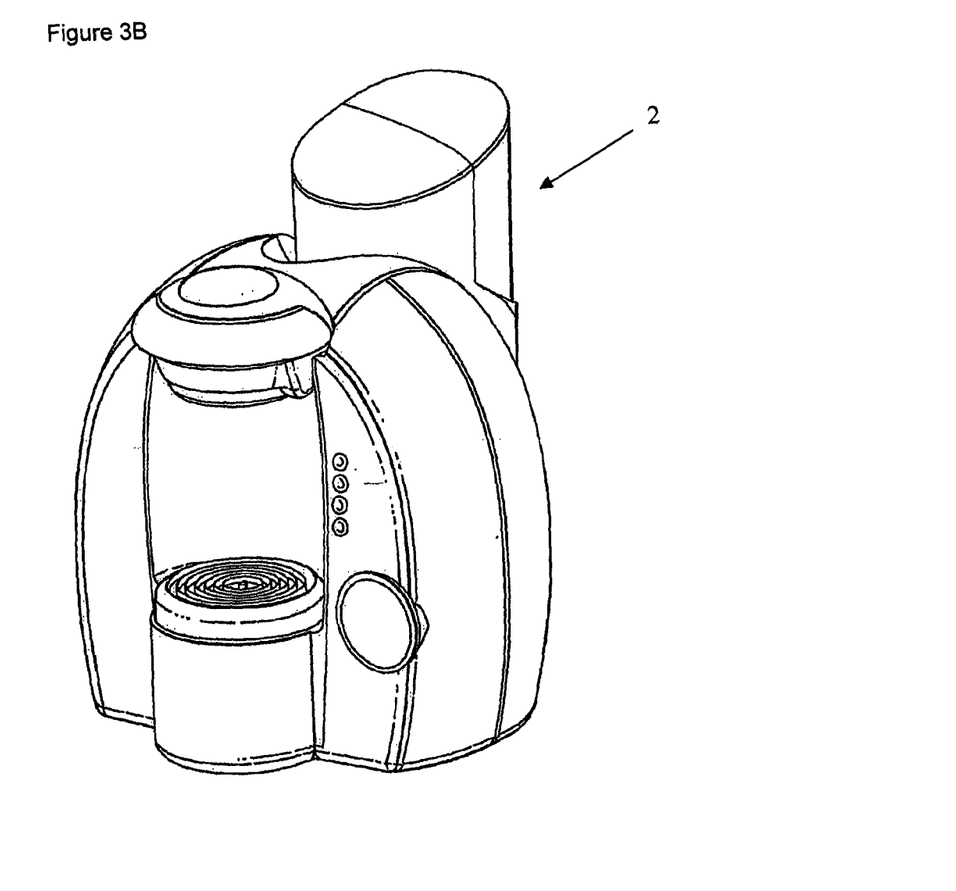
FIG. 3B shows a coffee beverage preparation system.

As shown in FIG. 2, in step A a soluble coffee is provided. In step B coffee oil is provided. In step C water (or a coffee extract) is provided. In step D the soluble coffee and the coffee oil are mixed together. In step E the soluble coffee (and coffee oil) and water are mixed together to provide a surface textured and aroma-improved soluble coffee F.

The disclosure will now be described in relation to the following non-limiting examples.

EXAMPLE

The experimental treatments were conducted on two starting spray dry soluble coffee materials:

1. Dark Spray Dry ("spray dry dark" is high density spray dried form of Millicano); Particle size, d90 approximately 250 μm; Density 460 g/L
2. SA5—commercial spray dry coffee powder (spray dried Arabica coffee); density 230 g/L; d90<500 um;

Different liquids were used in the surface coating trials:
1. Water (tap water)
2. Coffee oil—"CM" oil—coffee derived oil, gained from expeller pressing process
3. Spent Ground Oil—coffee derived oil, separated from exhausted coffee grounds after THEO at the Tricanter stage.
4. Coffee extract (30% solids, made by adding dark spray dry (30 g) to water (70 g) and dissolving).
5. Emulsion of 80/20 blend of 80% coffee oil and 20% water. (Blended using a high shear immersion mixer and adding the water slowly into the coffee oil while mixing, same technique as making mayonnaise).

The planetary mixer used for all examples was a Hobart planetary mixer using a whisk (wire whip) attachment.

Example 1 (Comparative)

This is an example that achieved an improved texture, but failed to provide an improved aroma.

Dark spray dried coffee was blended with CM oil (addition rate: 1.14-3.33 g/min) in a planetary mixer. This material was tested for flowability, colour, and aroma. It was found that 0.5% CM oil—4% CM oil levels were acceptable for beneficial texture, with a preference being 0.8%-2.0% CM oil due to oil slicking on the surface at higher levels.

Solubility was not significantly affected.

The trend showed that as oil level increased, the colour darkened.

Example 2

This is an example that achieved an improved texture and an improved aroma.

Dark spray dried coffee was blended with CM oil (addition rate: 1.14-3.33 g/min) in a planetary mixer. Then water was added while the mixer was mixing (addition rate: 1.38-4.20 g/min). The water was added to create the aroma boost. The amount of water added was based on the initial moisture content of the product, with a desired water addition level to create a ~1-3% increase in the final moisture of the product, and the product must remain less than 5% moisture (total).

Example 3

This is an example that achieved an improved texture and an improved aroma.

Dark spray dried coffee was blended with CM oil (addition rate: 1.14-3.33 g/min) in a planetary mixer. Then coffee extract was added while the mixer was mixing (addition rate: 3.00 g/min). The water from the extract was added to create the aroma boost. Coffee extract could be a range of concentrations (0.5%-50%) and must be pumpable to enable it to be sprayed onto the product.

The amount of coffee extract added was based on the initial moisture content of the product, with a desired coffee extract addition level to create a ~1-3% increase in the final moisture of the product, such that the product remains less than 5% moisture (total).

Example 4

This is an example that achieved an improved texture and an improved aroma.

Dark spray dried coffee was blended with spent ground oil (addition rate: 2.45 g/min) in a planetary mixer. Then water was added while the mixer was mixing (addition rate: 1.38 g/min). The water from the extract was added to create the aroma boost, although the boost was not as large as with CM oil, perhaps due to the high heat treatment applied to the spent ground oil during THEO.

The amount of water added was based on the initial moisture content of the product, with a desired coffee extract addition level to create a ~1-3% increase in the final moisture of the product, such that the product remains less than 5% moisture (total).

Example 5 (Comparative)

This is an example that achieved an improved texture, but failed to provide an improved aroma.

Dark spray dried coffee was mixed with the blend of CM oil and water (80%/20%, respectively) (addition rate: 1.14 g/min) in a planetary mixer. This material was tested for flowability, colour, and aroma. It was tested with 2% oil addition levels were acceptable for beneficial texture.

Solubility was not significantly affected.

Aroma was not increased, which may be attributed to the fact that the water was locked into the oil emulsion and not able to dissolve any surface volatiles from the coffee or oil.

Example 6 (Comparative)

This is an example that failed to achieve an improved texture or an improved aroma.

Dark spray dried coffee was blended with water or coffee extract (addition rates: 1.14-3.33 g/min) in a planetary mixer. This material was tested for flowability, colour, and aroma. Without the oil present, only localized wetting occurred and the liquid did not evenly coat the products. There was no aroma boost. The same was found result was achieved using SA5 as the starting material.

Example 7

This is an example that achieved an improved texture, but failed to provide an improved aroma.

SA5 spray dried coffee was blended with 0.5% and 4.0% CM oil (addition rate: 1.14-3.28 g/min) in a planetary mixer. Then water was added while the mixer was mixing (addition rate: ~1.38 g/min). The water was added to create the aroma boost. The amount of water added was based on the initial moisture content of the product, with a desired water addition level to create a ~1-3% increase in the final moisture of the product, and the product must remain less than 5% moisture (total). The colour was significantly darker (25-26La) compared to the starting product (35 La). The desired range for SA5 would be higher levels of oil (closer to 1.5-3%) as it is a larger starting particle and thus requires a higher volume of fluid for coating.

Particle Size Distribution

Particle size was measuring using a Sympatec Laser diffraction system (trigger conditions at 1.5% optical concentration, R6 lens for 20 seconds). Starting particles of SD dark had d90←260 um, and SA5<500 um (d90).

Testing for Agglomeration

Analysis was conducted on a number of samples to determine whether any agglomeration occurred in the process. The starting material prior to any surface texturization had a particle size (D90) of 226 μm and D99 of 350 μm. Spray drying has some natural size variation and the replicate of this also shows a particle size of 221 μm, but a D99 of 511 μm.

Testing the particle size of 0.8% oil addition gave a particle size of 226 μm (D90) and 549 μm (D99), and on replication 219 μm (D90) and 333 μm (D99)—showing that agglomeration did not occur during the oil application.

Upon addition of water to the oil-coated product gave a slight increase in particle size to 247 μm (d90) and 647 μm (d99). 90% of the particles are very similar in size to the control without any coating (SD Millicano) and a few slightly larger pieces (D99 of 646 vs. 511 μm) are found during the surface texturization step.

This is very different compared to typical agglomeration processes where the D90 and D99 are much greater, since the goal of such processes is to stick smaller pieces together.

Texture Analysis

One of the biggest changes in the samples in accordance with the present method was their texture. The material became less flowable and this measure of flowability was measured using bulk and tapped density as well as angle of repose.

The US Pharmacopia offers several ways to measure powder flowability as bulk density and tapped density and angle of repose are recommended. These do not measure the intrinsic properties of the powders, but rather are used to compare the different powders in relation to their behaviour. Because of this, the methods are dependent on extrinsic properties, the method for measuring bulk and tapped density was repeated in triplicate or more. Compression index is believed to be an indirect measurement of bulk density, size, shape, surface area, moisture content, and cohesiveness as these all indirectly affect how well the material is able to pack into a container.

To measure bulk density, a 250 mL glass volumetric flask was used and 50 g (+/−0.1 g) of powder was used. The powder was gently poured into the flask using a funnel and was lightly scraped on the top surface to smooth out any mound that may have been observed due to the pouring. The flask was secured and tapped for 70 taps using a jolting volumeter.

The Carr's Compression index is described in Carr, R. L. Evaluating Flow Properties of Solids. Chem. Eng. 1965, 72, 163-168.

$$\text{Carr's compression index} = 100\% \times [(\rho\_tapped - \rho\_bulk)/\rho\_tapped]$$

(where $\rho$ is density)

The Hausner ratio=$\rho\_tapped/\rho\_bulk$.

The guidelines for categorizing powder flowability have been determined by Carr and are described as below.

| Compressibility Index (%) | Flow Character | Hausner Ratio |
|---|---|---|
| ≤10 | Excellent | 1.00-1.11 |
| 11-15 | Good | 1.12-1.18 |
| 16-20 | Fair | 1.19-1.25 |
| 21-25 | Passable | 1.26-1.34 |
| 26-31 | Poor | 1.35-1.45 |
| 32-37 | Very Poor | 1.46-1.59 |
| >38 | Very, very poor | >1.60 |

The samples consistently showed an increase in the Carrs compression index when treated with an oil treatment and then a water treatment. The increases were greater than that observed for separate water or oil treatments. The flowability generally improved by a flow-character category compared to the untreated material.

Standard Kenco soluble coffee (SA5) is categorized as an example of an excellent flowing powder. This is normally considered good as the powders need to be easily flowing into the jars (for packing) and easily out (for the consumer). The powder is small spheres created by spray drying and these easily flow past one another.

Roast and ground coffee is considered to be less flowable than standard spray dried coffee (SA5), but still classified as a 'good' flowing powder. This is due to the inherent oil present, as well as the more irregulat particle sizes and shapes created by grinding.

The surface texturization process applied here enables the products to shift from standard soluble flowability to much less flowable powder ("fair"). This is only found on experiments which engage the process of oil coating first followed by water.

Experiments done with only adding water were slightly less flowable due to clumps from localized wetting from the water addition. Due to the nature of soluble coffee, it dissolves upon contact from water. It is speculated that when the coffee is first coated with oil, this creates a barrier layer that gives the texture. This oil coating prevents the localized wet spots and clumping found from just a water addition.

The secondary addition of water sticks to the surface of the coffee but does not fully dissolve the coffee. It is proposed that it is adsorbed by some small pores missed by the oil and potentially solubilises any water-soluble aroma compounds trapped within the oil—thus contributing to the desirable smell. However, a nice aroma was also generated from spent ground oil—which has most of the aroma already stripped from the beans. This would lead one to conclude that the oil addition gives some aroma benefit as well as some localized wetting which allows the soluble coffee to have slight solubilisation and contribute to the smell.

It does not take much water (~1%) addition to generate a desirable smell. It is also noticed that if the oil is just added, there is no desirable smell and if only water is added, there is no desirable smell. Thus, one would believe that the water is solubilising some volatiles that may be present in the oil. The blend of emulsifying the water into the oil prevents the water from solubilising the aroma because it is already trapped within the oil matrix.

In comparing both methods for observing packing, we find that the excellent flowing materials are those made with SA5. Good flowing powder, the starting material (SD Dark) was similar to Roast in ground in flowability to start with, and low levels of oil addition kept the flow properties within the same level.

A shift in flowability came with adding water to the 0.8% CM oil sample (Carr's index, only) or going to a higher CM oil level (>2%). The addition of water after oil is critical to create the reduction in flowability.

Colour

For all samples (SD Dark and SA5), this process of produced a significantly darker product. This is desirable as the consumers desire a dark product compared to the standard soluble product (SA5) as this give a closer appearance to roast and ground and less dry and dusty. A lower colour value is a darker product (generally at least 4 La darker). The surface treated products are all darker than the dark spray dry and the surface treated SA5 samples are darker than commercial SA5. The hypothesis for this is that the light reflects from the pores and cracks in the surface. By coating the pores and filling in the small voids with oil and/or water, the colour appears darker.

| Samples | Average Colour (La) |
|---|---|
| SD Dark + 4% Spt Ground Oil + H2O | 6.9 |
| SDdark + 4% CM + H20 | 7.0 |
| SDdark + 4% CM | 7.6 |
| SD Dark + 4% Spt Ground Oil | 7.6 |
| SDdark + 2% CM + H20 | 7.9 |
| SD Dark + 2% CM Oil + 30% coffee Extract | 8.1 |
| SDdark + 2% CM | 8.5 |
| SD dark + 0.5% CM + H20 | 9.1 |
| SD dark + 80/20 CM Oil (2%)/H20 | 9.1 |
| SD dark + 0.5% CM | 9.4 |
| SD Dark | 11.0 |
| Kronung Roast & Ground | 11.4 |
| SA5 + 4% Oil + H20 | 25.5 |
| SA5 + 4% Oil | 26.2 |
| SA5 | 35.2 |

In summary, the process of creating a wet-sand texture in the spray dry product makes the appearance look more 'alive'. The flowability is reduced so that it does not seem similar to current spray dry powder and rather, acts more like roast and ground (good flowability) or goes even a step further (fair flowability) to get further differentiation. The aroma is similar to roast and ground which is a key driver for the consumer to believe that the product is more 'alive' and closer to Roast and Ground. The colour is darker in all cases from the surface treatment process and this is desirable from the consumer. The key to the process is to use a surface coating of oil prior to a surface coating of a water-based second coat (water or coffee extract). The oil is essential to creating the texture which does not rapidly dissolve when the water is added. The water is essential for creating the desirable aroma. When the oil is emulsified into the water (80/20 blend), this gives a desirable texture with a 1-step process, but does not provide a free water for a desirable aroma (no aroma).

Although preferred embodiments of the disclosure have been described herein in detail, it will be understood by those skilled in the art that variations may be made thereto without departing from the scope of the disclosure or of the appended claims.

The invention claimed is:

1. A method for surface treating a soluble coffee powder, the method comprising:
   providing a soluble coffee powder;
   providing a coffee oil in an amount of from 0.5 to 4 wt. % relative to the soluble coffee powder;
   providing water in an amount of from 1 to 3 wt. % relative to the soluble coffee powder;
   mixing, at a temperature of from 10 to 40° C. and prior to reconstitution of the surface-treated soluble coffee powder with an aqueous medium to form a beverage, the soluble coffee powder with the coffee oil provided in the amount of from 0.5 to 4 wt. % relative to the soluble coffee powder, the mixing of the soluble powder with the coffee oil being effective to apply the coffee oil to a surface of the soluble coffee powder to provide an oil layer coating on the soluble coffee powder; and
   mixing, at a temperature of from 10 to 40° C., after the mixing of the soluble coffee powder with the coffee oil, and prior to the reconstitution of the surface-treated soluble coffee powder with the aqueous medium to form the beverage, the soluble coffee powder including the oil layer coating with the water provided in the amount of from 1 to 3 wt. % relative to the soluble coffee powder, the mixing of the soluble coffee powder including the oil layer coating with the water being effective to apply the water to a surface of the oil layer coating of the soluble coffee powder to provide the surface-treated soluble coffee powder, the surface-treated soluble coffee powder being configured to form the beverage when reconstituted in the aqueous medium.

2. The method according to claim 1, wherein the coffee oil comprises Coloma oil and/or spent ground oil.

3. The method according to claim 1, wherein the coffee oil is in an amount of from 0.8 to 2 wt. % relative to the soluble coffee powder.

4. The method according to claim 1, wherein the water is added in an amount sufficient to provide a final moisture content of the surface-treated soluble coffee powder of from 2.5 to 6 wt. %.

5. The method according to claim 1, wherein the method is carried out with substantially no agglomeration of the surface-treated soluble coffee powder.

6. The method according to claim 1, wherein a D90 of the surface-treated soluble coffee powder does not substantially increase.

7. The method according to claim 1, wherein the water is added to the soluble coffee powder including the oil layer coating as a spray during the mixing.

8. The method according to claim 1, wherein each of the mixing steps is carried out at about room temperature.

9. The method according to claim 1, wherein the surface-treated soluble coffee powder is spray-dried coffee powder.

10. The method according to claim 1, wherein the surface-treated soluble coffee powder is a foaming soluble coffee powder and/or comprises finely ground roasted coffee particles.

11. The method according to claim 1, the method further comprising a step of grinding or milling the surface-treated soluble coffee powder.

12. The method according to claim 1, the method further comprising packaging the surface-treated soluble coffee powder.

13. The method according to claim 4, wherein the final moisture content of the surface-treated soluble coffee powder is about 5 wt. %.

* * * * *